(12) United States Patent
Panikkar et al.

(10) Patent No.: US 12,379,912 B2
(45) Date of Patent: Aug. 5, 2025

(54) ADJUSTABLE EXECUTION MODELS FOR PROCESSING USAGE DATA FOR REMOTE INFRASTRUCTURE

(71) Applicant: Dell Products L.P., Round Rock, TX (US)

(72) Inventors: Shibi Panikkar, Bangalore (IN); Sisir Samanta, Bangalore (IN); Bhanu Pratap Singh, Mumbai (IN)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 17/834,691

(22) Filed: Jun. 7, 2022

(65) Prior Publication Data

US 2023/0393829 A1   Dec. 7, 2023

(51) Int. Cl.
*G06F 8/61* (2018.01)

(52) U.S. Cl.
CPC . *G06F 8/63* (2013.01); *G06F 8/62* (2013.01)

(58) Field of Classification Search
CPC ..................................... G06F 8/63; G06F 8/62
See application file for complete search history.

(56) References Cited

U.S. PATENT DOCUMENTS

| | | | |
|---|---|---|---|
| 9,225,510 B1 * | 12/2015 | Wharton | H04L 67/02 |
| 10,974,053 B2 * | 4/2021 | Howard | A61N 1/36071 |
| 2015/0326461 A1 * | 11/2015 | Singh | H04L 43/12 |
| | | | 709/224 |
| 2015/0363185 A1 * | 12/2015 | Garratt | G06F 8/60 |
| | | | 717/168 |
| 2016/0209834 A1 * | 7/2016 | Schreder | G05B 19/41835 |

(Continued)

OTHER PUBLICATIONS

Utility Configuration Collector Metering: Overview & Requirements, Dell Technologies, available at: https://dl.dell.com/content/docu93453_ucc-2-0-metering-overview-and-requirements.pdf?language=en-us (last accessed Apr. 25, 2022), published Oct. 14, 2021.

(Continued)

*Primary Examiner* — Qing Chen
(74) *Attorney, Agent, or Firm* — Ryan, Mason & Lewis, LLP

(57) ABSTRACT

Methods, apparatus, and processor-readable storage media for processing usage data for remote infrastructure using adjustable execution models are provided herein. An example computer-implemented method includes: obtaining a data structure related to a subscription request for hardware infrastructure provided by a service provider, wherein the data structure is obtained by a processing engine deployed on the hardware infrastructure at a remote location; analyzing the data structure to build an execution model comprising function blocks for processing usage data associated with the hardware infrastructure and one or more instructions to execute the function blocks; processing the usage data for a given time period in accordance with the execution model; providing execution data associated with the plurality of function blocks; and automatically adjusting the execution model for an additional time period using information obtained from the service provider, wherein the obtained information is based at least in part on the execution data.

20 Claims, 7 Drawing Sheets

(56) References Cited

U.S. PATENT DOCUMENTS

| | | | | |
|---|---|---|---|---|
| 2021/0011701 A1* | 1/2021 | Kuwahara | ................. | G06F 8/62 |
| 2021/0019141 A1* | 1/2021 | Marsnik | ................... | G06N 7/01 |
| 2021/0089354 A1* | 3/2021 | Nixon | ....................... | G06F 8/63 |
| 2021/0365256 A1* | 11/2021 | Cadarette | .............. | H04L 63/102 |
| 2022/0197306 A1* | 6/2022 | Cella | ...................... | G06N 20/10 |
| 2022/0300606 A1* | 9/2022 | Veettikattil | ............. | G06F 21/54 |
| 2022/0317989 A1* | 10/2022 | Hettiwatte | .......... | G06F 9/44505 |
| 2023/0080518 A1* | 3/2023 | Bregman | ................. | G06F 8/63 |
| | | | | 718/1 |

OTHER PUBLICATIONS

Meiers, Jason, Cloud metering and billing:Billing metrics for compute resources in the cloud, International Business Machines Corporation, available at: https://developer.ibm.com/articles/cl-cloudmetering/ (last accessed Jun. 6, 2022), published Aug. 8, 2011.

* cited by examiner

ADJUSTABLE EXECUTION MODELS FOR PROCESSING USAGE DATA FOR REMOTE INFRASTRUCTURE

FIELD

The field relates generally to information processing systems, and more particularly to the processing of usage data related to such systems.

BACKGROUND

Service providers often deploy managed storage and/or server infrastructure at a customer location, and the customer pays for the infrastructure based on the use of the infrastructure. Usage data pertaining to the infrastructure is typically collected at the customer location and sent to a central location associated with a given service provider for processing. Such techniques can be slow and/or inefficient and can also result in data security and compliance issues.

SUMMARY

Illustrative embodiments of the disclosure provide techniques for processing usage data for remote infrastructure using adjustable execution models. An exemplary computer-implemented method includes: obtaining a data structure related to at least one subscription request for hardware infrastructure provided by a service provider, wherein the data structure is obtained by a processing engine deployed on the hardware infrastructure at a remote location; analyzing, by the processing engine, the data structure to build an execution model, wherein the execution model comprises (i) a plurality of function blocks for processing usage data associated with the hardware infrastructure and (ii) one or more instructions to execute the plurality of function blocks; processing the usage data for a given time period in accordance with the execution model; providing, to the service provider, execution data comprising at least one of input data and output data for the given time period for at least some of the plurality of function blocks of the execution model; and automatically adjusting the execution model for at least one additional time period using information obtained from the service provider, wherein the obtained information is based at least in part on the execution data.

Illustrative embodiments can provide significant advantages relative to conventional usage data collection techniques. For example, technical problems associated with conventional usage data collection techniques are mitigated in one or more embodiments by identifying one or more service items associated with hardware infrastructure, and automatically selecting and deploying a specific set of software function blocks to remotely process usage data pertaining to the hardware infrastructure based on the identified service items. Such embodiments can enable usage data to be streamed substantially in real time, reduce the number of computing resources that are needed to process usage data at the customer location, and/or improve data security and compliance relative to conventional approaches.

These and other illustrative embodiments described herein include, without limitation, methods, apparatus, systems, and computer program products comprising processor-readable storage media.

DETAILED DESCRIPTION

Figure 1:
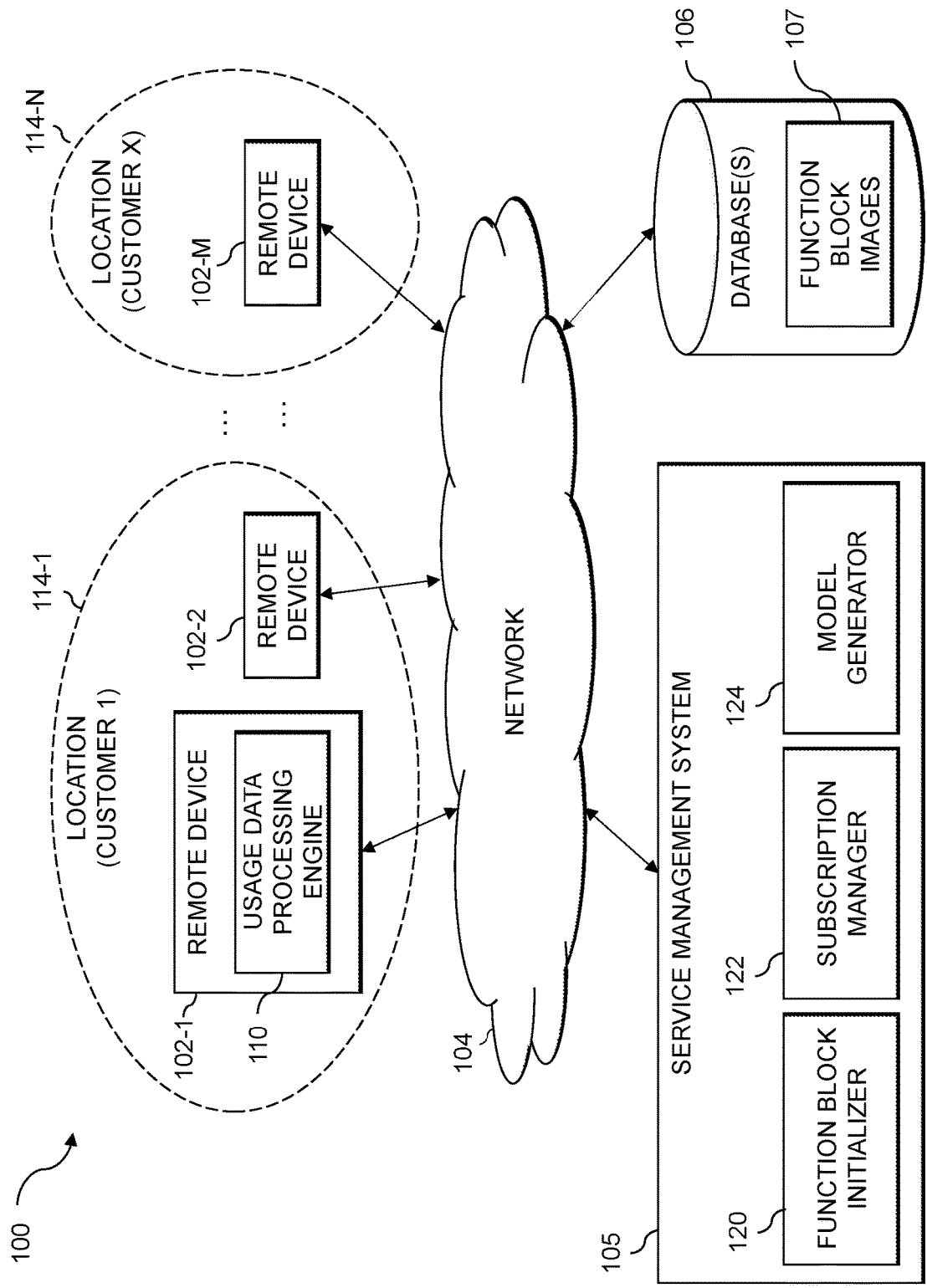
FIG. 1 shows an information processing system configured for processing usage data for remote infrastructure using adjustable execution models in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Hybrid and private on-premises clouds can offer advantages to enterprises relative to public clouds in terms of compliance, privacy, and security, for example. However, setting up and maintaining the infrastructure for such clouds can be technically challenging and expensive. To address such issues, service providers are increasingly offering private clouds using a pay-as-you-go subscription model. For example, a given service provider can deploy and manage hardware infrastructure for a private cloud at a customer location. Such models often require the service provider to obtain usage data associated with the private cloud, for example, to maintain the infrastructure and to generate accurate billing information for the customer.

Conventional techniques for collecting usage data for remotely managed infrastructure generally follow one of the following approaches. The first approach includes collecting and metering usage data from one or more hardware devices deployed at a customer location and sending the usage data to a central location (e.g., a central server and/or the cloud) to be processed. The central location generally includes a rating and billing software engine that aggregates and rates the usage data. However, providing a real-time (or substantially real-time) view of the usage data to the customer is challenging as the usage data is often collected from different geographic customer locations. Processing the data can also be complex due to the number of customers, where each customer may have different combinations of subscription services (e.g., multiple different compute and/or storage subscriptions). The geographical regions may also have different rating applications or terms. Additionally, usage data can be lost or corrupted when in transit to the central location, thus leading to incorrect billing. Sending sensitive, regulated, and/or confidential data, for example, can also raise data security and compliance issues, as the data often needs to be processed (e.g., filtered or encrypted) before it is sent to the central location.

The second approach includes collecting and processing the usage data at the customer location. Such techniques generally include installing a data processing software engine or multiple data processing engines at the customer location. The data processing software engines are often computationally expensive, and thus may require additional hardware resources to be deployed to the customer location. Installing multiple specific usage data processing engines (e.g., one engine for each subscription item) can reduce the amount of required computing resources but can also increase the complexity of maintaining and updating such engines. This can be particularly challenging since customers often make changes or additions to their subscriptions.

By way of example, a given customer may subscribe to multiple different items (e.g., compute service(s), networking service(s), and/or storage service(s)), and each item may have its own configuration and rate card complexity. Accordingly, different subscription items may require different sets of processes for processing the usage data. For example, a first subscription item may not require a ToD (Time of Day) based rating process, a second subscription service may not require a quantity tier-based rating process, a third subscription service may not require a vertical and/or horizontal aggregation process of usage data, and a fourth subscription service may not require a usage data smoothing process. Typically, core functions of usage data processing engines (including mediation and rating processing systems) are packaged, deployed, and executed in runtime environments without accounting for such differences, and so a separate usage data software engine would need to be installed for each subscription item and at each customer (or edge) location. This type of approach would require additional hardware resources at each location and negate some of the advantages of an edge computing model.

At least some exemplary embodiments described herein include selecting and deploying a specific set of function blocks that are needed to process usage data of subscription items at a given customer location. Such embodiments allow the usage data to be efficiently processed at the customer location while reducing or eliminating the need to deploy additional hardware resources.

FIG. 1 shows a computer network (also referred to herein as an information processing system) 100 configured in accordance with an illustrative embodiment. The computer network 100 comprises a plurality of remote devices 102-1, 102-2, . . . 102-M, collectively referred to herein as remote devices 102. The remote devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a service management system 105.

The remote devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The remote devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the service management system 105 can have at least one associated database 106 configured to store usage data pertaining to, for example, function block images 107. At least a portion of the one or more remote devices 102 can be configured to obtain one or more of the function block images 107 from the at least one database 106 (e.g., via an application programming interface (API)), as described in more detail elsewhere herein. Also, at least a portion of the one or more remote devices 102 can also have at least one associated database (not explicitly shown in FIG. 1).

The term "function block" as used herein is intended to be broadly construed so as to encompass a standalone software process or function used for collecting or processing usage data. For example, a given function block may correspond to a sub-process for collecting, metering, or rating usage data. Non-limiting examples of such sub-processes include: metered data collection, data filtration, duplicate check process, missing check process, data smoothing, data aggregation process, event identification, event transformation, subscription identification, rate card identification, resource dependency process, linear charge, step calculation, volume-based calculation, proration, itemization, and geolocation tagging. In at least some embodiments, a given function block can be implemented or executed as a software container, a wrapped microservice, and/or as a function-as-a-service (FaaS).

An example database 106, such as depicted in the present embodiment, can be implemented using one or more storage systems associated with the service management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the remote devices 102 is assumed to be located at a location of a particular customer. In the FIG. 1 embodiment, locations 114-1, . . . 114-N (collectively locations 114) are represented using dashed circles, and each location 114 corresponds to one of a plurality of customers (customer 1, . . . customer X). More specifically, the example in FIG.

1 shows that remote devices 102-1 and 102-2 are located within location 114-1 of customer 1, and remote device 102-M is located within location 114-N of customer X. It is to be appreciated, however, that each customer may be associated with more than one of the locations 114. Thus, in other examples, the remote device 102-1 may be in a first one of the locations 114 corresponding to customer 1, and the remote device 102-2 may be in a different one of the locations 114 that also corresponds to customer 1. It is also assumed that at least a portion of the locations 114 are remote from the service management system 105. In other embodiments, it is possible for one or more of the remote devices 102, the service management system 105, and/or the at least one database 106 to be implemented at least in part in one or more same locations.

Also associated with the service management system 105 are one or more input-output devices, which illustratively comprise keyboards, displays or other types of input-output devices in any combination. Such input-output devices can be used, for example, to support one or more user interfaces to the service management system 105, as well as to support communication between the service management system 105, the remote device 102, and other related systems and devices not explicitly shown.

Additionally, the service management system 105 in the FIG. 1 embodiment is assumed to be implemented using at least one processing device. Each such processing device generally comprises at least one processor and an associated memory, and implements one or more functional modules for controlling certain features of the service management system 105.

More particularly, the service management system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the service management system 105 to communicate over the network 104 with the remote devices 102, and illustratively comprises one or more conventional transceivers.

In some embodiments, each of the remote devices 102 can be implemented in a similar manner as described above for the service management system 105. In the FIG. 1 example, the remote device 102-1 includes a usage data processing engine 110, which is used to collect and/or process usage data corresponding to the remote device 102-1, and possibly one or more other remote devices 102 within location 114-1 (such as remote device 102-2). It is to be appreciated that, in some embodiments, the usage data processing engine 110 may be implemented using one or more of the remote devices 102 in location 114-1. It is also assumed that at least one usage data processing engine 110 is implemented on at least one of the remote devices 102 in each of the locations 114, which are not explicitly shown in FIG. 1.

By way of example, the remote devices 102-1 and 102-2 may correspond to hardware infrastructure for implementing at least a portion of a private and/or hybrid cloud for customer 1. In such an example, the hardware infrastructure (e.g., storage and/or server infrastructure) can be managed by a service provider associated with service management system 105. Accordingly, the usage data processing engine 110 can be configured to collect and process usage data associated with the hardware infrastructure to enable billing and/or other services, as described in more detail elsewhere herein. Components of the usage data processing engine 110 are described in more detail in conjunction with FIG. 2, for example.

The service management system 105 includes a function block initializer 120, a subscription manager 122, and a model generator 124. Generally, the function block initializer 120 creates function block images 107 and uploads them to the at least one database 106. In at least some examples, each function block image 107 can comprise software that is deployable to the usage data processing engine 110 to perform a respective function used for processing usage data. The subscription manager 122 manages subscription and product information associated with each of the customers. The model generator 124 generates at least one machine learning (ML) model based at least in part on feedback related to collecting and processing usage data at one or more of the locations 114 and the subscription information maintained by the subscription manager 122. The at least one ML model is trained to automatically select at least a subset of the function block images 107 for a given one of the locations 114 and to choreograph the execution of the respective functions associated with the subset of the function block images 107, as described in more detail elsewhere herein. In some embodiments, the at least one ML model comprises a classifier model as described in more detail with reference to FIG. 4, for example.

It is to be appreciated that this particular arrangement of elements 120, 122, and 124 illustrated in the service management system 105 of the FIG. 1 embodiment is presented by way of example only, and alternative arrangements can be used in other embodiments. For example, the functionality associated with the elements 120, 122, and 124 in other embodiments can be combined into a single element, or separated across a larger number of elements. As another example, multiple distinct processors can be used to implement different ones of the elements 120, 122, and 124 or portions thereof.

At least portions of elements 120, 122, and 124 may be implemented at least in part in the form of software that is stored in memory and executed by a processor.

It is to be understood that the particular set of elements shown in FIG. 1 for service management system 105 involving remote devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the service management system 105 and database(s) 106 can be on and/or part of the same processing platform.

An exemplary process utilizing elements 120, 122, and 124 of an example service management system 105 in computer network 100 will be described in more detail with reference to, for example, the flow diagram of FIG. 4. An exemplary process utilizing usage data processing engine 110 of an example remote device 102-1 in computer network 100 will be described in more detail with reference to, for example, the flow diagram of FIG. 5.

Figure 2:
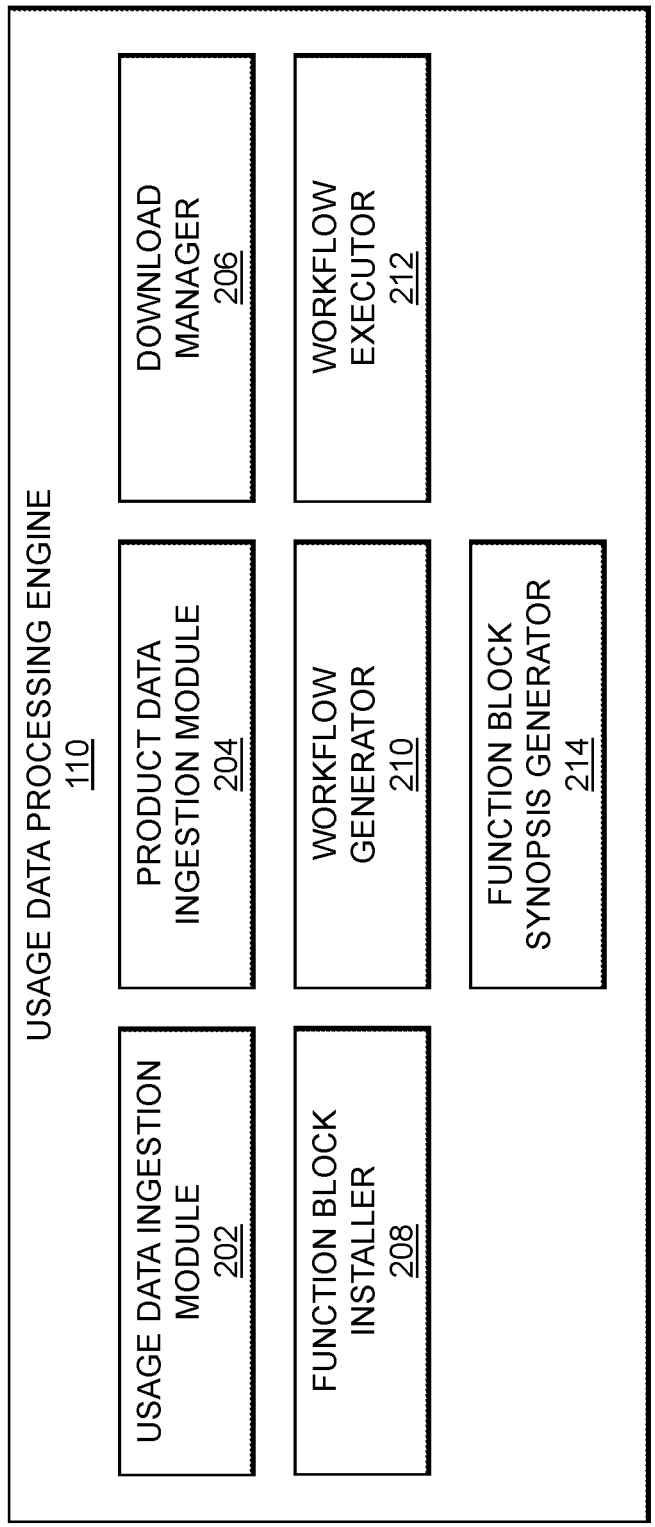
FIG. 2 is a block diagram showing components of a usage data processing engine in an illustrative embodiment.

FIG. 2 is a block diagram showing components of a usage data processing engine 110 in an illustrative embodiment. In this example, the usage data processing engine 110 includes a usage data ingestion module 202, a product data ingestion module 204, a download manager 206, a function block installer 208, a workflow generator 210, a workflow executor 212, and a function block synopsis generator 214.

The usage data processing engine 110, in some embodiments, can be deployed on hardware infrastructure that is shipped to a customer location as part of a subscription request for storage, networking, and/or computing infrastructure. The subscription manager 122 assigns the subscription request a request identifier (ID) and maps the request ID to one or more of the function blocks according to the details of the request. A machine ID (or a service tag) is assigned to the hardware associated with the request when the hardware is ready to ship to the customer, and the machine ID is mapped to the relevant function blocks. The usage data processing engine 110, in some embodiments, is installed on the hardware when it is shipped.

When the hardware initially boots up at the customer location, the usage data processing engine 110 reads the machine ID and obtains the request ID associated with the customer request. The usage data processing engine 110 uses a "call home" function to identify the function blocks that are mapped to the request ID. The download manager 206 downloads the corresponding function block images 107 from the at least one database 106, which are then installed by the function block installer 208.

The workflow generator 210 generates workflows (e.g., usage data mediation and rating workflows) for the service items and/or plans (e.g., corresponding to storage, server, and/or networking infrastructure) that were requested by the customer. The workflows can be generated so as to avoid using duplicate instances of the function blocks. Accordingly, if the customer request includes multiple features (e.g., storage and computing features), then one or more of the function blocks can be reused. The workflow executor 212 then orchestrates the execution of the workflows. In at least one embodiment, the workflow executor 212 may orchestrate the execution of workflows based at least in part on configuration information associated with the subscription request. The configuration information can be obtained from the subscription manager 122 based on the request ID and the machine ID, for example.

In some embodiments, the configuration information for a given subscription item may be provided in a JSON (JavaScript Object Notation) format, and include one or more of the following: the type of item (e.g., compute, networking, and/or storage), a performance tier, a hardware type, a license type, a contract term, a number of compute instances, and an amount of storage resources. The subscription manager 122 may also maintain rate card information for the subscription items. The rate card information may include a rate type (e.g., committed or on-demand), a unit of measurement (e.g., amount of storage/hour, a number of instances/hour, etc.), a cost per unit of measure, and a term duration (e.g., month, year, etc.). The rate card may also include other information such as currency information, one or more subscription identifiers, and discount information.

The usage data ingestion module 202 reads the usage data from the components (e.g., storage, server, and/or networking components) of the hardware at the customer location so that it can be processed by the relevant function blocks. The product data ingestion module 204 obtains system and product information relevant for processing the usage data, for example. The function block synopsis generator 214 collects results of the workflows and generates a usage synopsis of the hardware at the given customer location. The usage synopsis can be provided as feedback to the model generator 124 of the service management system 105 of the service provider. For example, the usage synopsis may include information related to which function blocks were used and how the function blocks were orchestrated.

The service management system 105, in some embodiments, can use the usage synopsis information provided by the usage data processing engine 110 (as well as usage synopsis information from other locations and/or other customers) to generate an ML-based model that outputs a canonical model of function blocks as well as metadata for orchestrating the execution of the function blocks for a given customer request.

In response to a customer generating a new request for additional services, the usage data processing engine 110 can generate instructions to update the function block images, if needed. For example, the usage data processing engine 110 can download another function block image that is not already installed in order to process the new request. Similarly, if any changes are made to an existing request, then the usage data processing engine 110 can evaluate the existing workflows to determine whether or not the workflows need to be regenerated to accommodate the changes.

Figure 3:
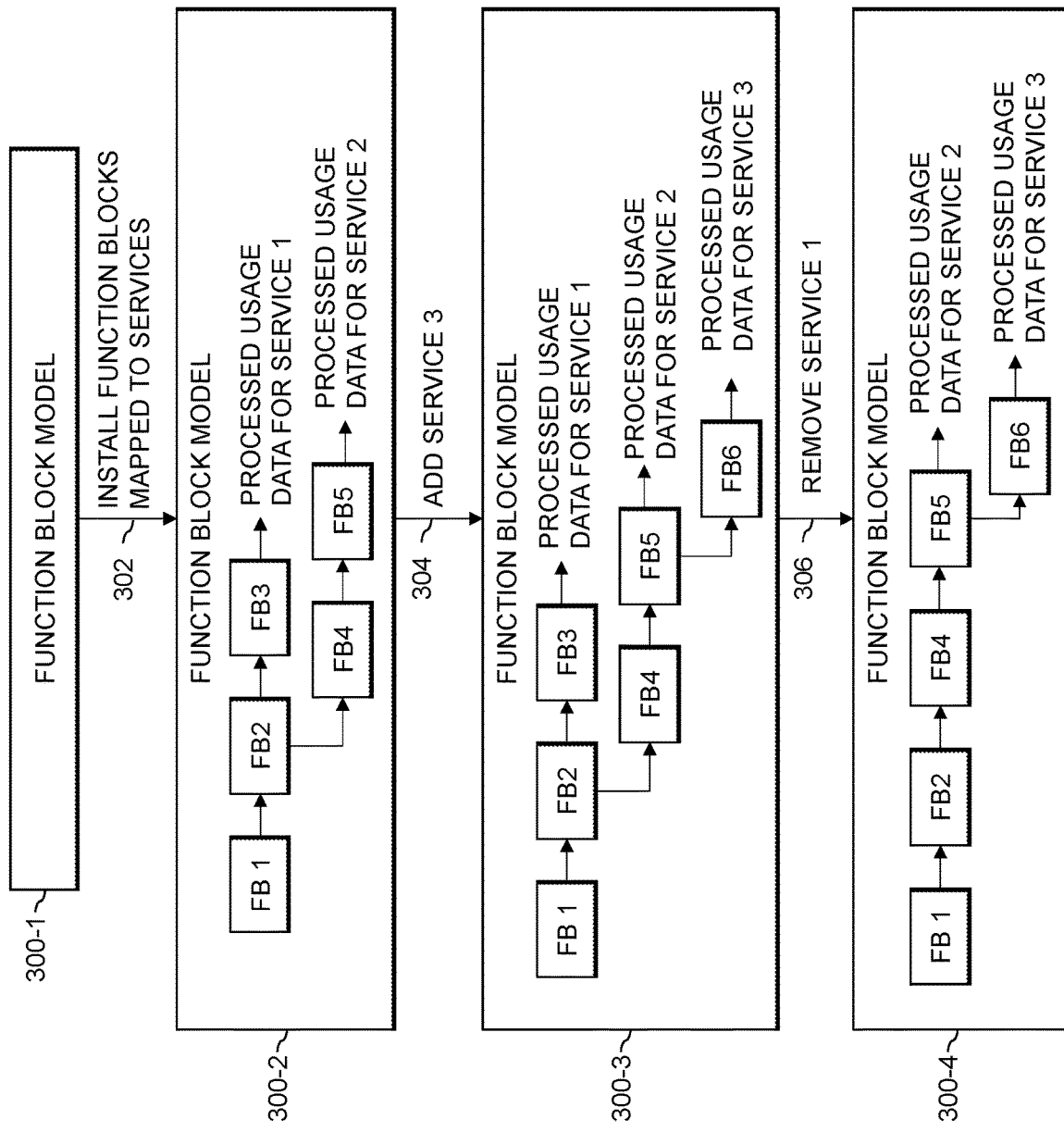
FIG. 3 shows an example of a function block model being updated in response to service changes in accordance with an illustrative embodiment.

Referring now to FIG. 3, this figure shows an example of a function block model being updated in response to service changes in accordance with an illustrative embodiment. In this embodiment, a function block model 300-1 is installed on at least a portion of hardware infrastructure associated with a customer request. For example, the customer request may involve one or more services, which can be mapped to the relevant function blocks that are required for processing usage data (by usage data processing engine 110, for example), as described in more detail elsewhere herein. Initially, the function block model 300-1 is shipped without function blocks installed, and thus can be referred to as an "empty" function block model.

When the hardware infrastructure is set up at the customer location, the function blocks relevant to the services in the customer request are installed as indicated by arrow 302. In the FIG. 3 example, it is assumed that the customer request includes two services, and the services are mapped to following function blocks (FB s): service 1 is mapped to FB1, FB2, and FB3; and service 2 is mapped to FB1, FB2, FB4, and FB5. The corresponding function block images are downloaded (e.g., from the database(s) 106) and installed, which results in function block model 300-2. It is noted that metadata can also be downloaded to indicate the order in which the function blocks are executed. Usage data for services 1 and 2 are then processed in accordance with the function block model 300-2.

Next, the customer submits a request to add a new service (service 3) as represented by arrow 304. In this example it is assumed that service 3 processes usage data using FB1, FB2, FB4, FB5, and FB6. Accordingly, the usage data processing engine 110 downloads and installs the function block image for FB6, which results in function block model 300-3.

In this example, the customer then submits a request to remove service 1 from the subscription as indicated by arrow 306. In response to this request, the usage data processing engine 110 determines that FB3 is no longer needed, and thus removes or uninstalls FB3, which results in function block model 300-4.

Accordingly, at least some of the embodiments download and install only the function blocks that are needed to process usage data for the services that are currently active for the customer while avoiding duplicate instances of such function blocks from being installed.

In at least some examples, the functional model may be implemented as one or more data structures that indicate the relevant function blocks as well as the information for determining an order for executing the function blocks. The term "data structure" as used herein is intended to be broadly construed, so as to encompass, for example, formatted data, data tables, or other organized data, or any portion thereof. Any references herein to "obtaining a data structure" are intended to be broadly construed so as to encompass, for example, obtaining one or more fields or other portions of a larger data structure.

As an example, assume a service requires function blocks for the following functions: (1) event transformation; (2) identify subscription; (3) identify ratable metric; (4) linear charge; (5) tag geolocation; (6) tag tax information; and (7) record charge and item. Also assume that the functions 1 to 4 are executed sequentially, functions 5 and 6 are executed in parallel after executing function 4, and function 7 is executed after executing functions 5 and 6. This information can be captured in the following data structure:

```
01:         "FunctionBlocks": {
02:            "FunctionBlock":
03:               [
04:                  {"Name": "Event Transformation",
05:                   "ID":"1",
06:                   "ExecuteAfter": "Initialization"
07:                  },
08:                  {"Name": "Identify Subscription",
09:                   "ID":"2",
10:                   "ExecuteAfter": "1"
11:                  },
12:                  {"Name": "Identify Ratable Metric",
13:                   "ID":"3",
14:                   "ExecuteAfter": "2"
15:                  },
16:                  {"Name": "Linear charge",
17:                   "ID":"4",
18:                   "ExecuteAfter": "3"
19:                  },
20:                  {"Name": "Tag Geolocation",
21:                   "ID":"5",
22:                   "ExecuteAfter": "4"
23                   },
24:                  {"Name": "Tag Tax Information",
25:                   "ID":"6",
26:                   "ExecuteAfter": "4"
27:                  },
28:                  {"Name": "Record Charge and Item",
29:                   "ID":"7",
30:                   "ExecuteAfter": "5 && 6"
31:                  }
32:               ]
33:         }
```

The usage data processing engine 110 can be configured to process the usage data according to the data structure above, for example.

In some embodiments, the usage data processing engine 110 generates a function block synopsis comprising information related to the usage data processing. Referring again to the example above, consider a situation when executing function block 5 (i.e., tag geolocation), and function block 6 (i.e., tag tax information) in parallel results in an error due to a race condition, or when function block 3 (i.e., identify ratable metric) substantially always returns "false" for this particular customer. This information can be included in the synopsis and can be used to improve the performance of the function block model. For example, the model can be adjusted to return a result of "false" without needing to execute function block 3.

Figure 4:
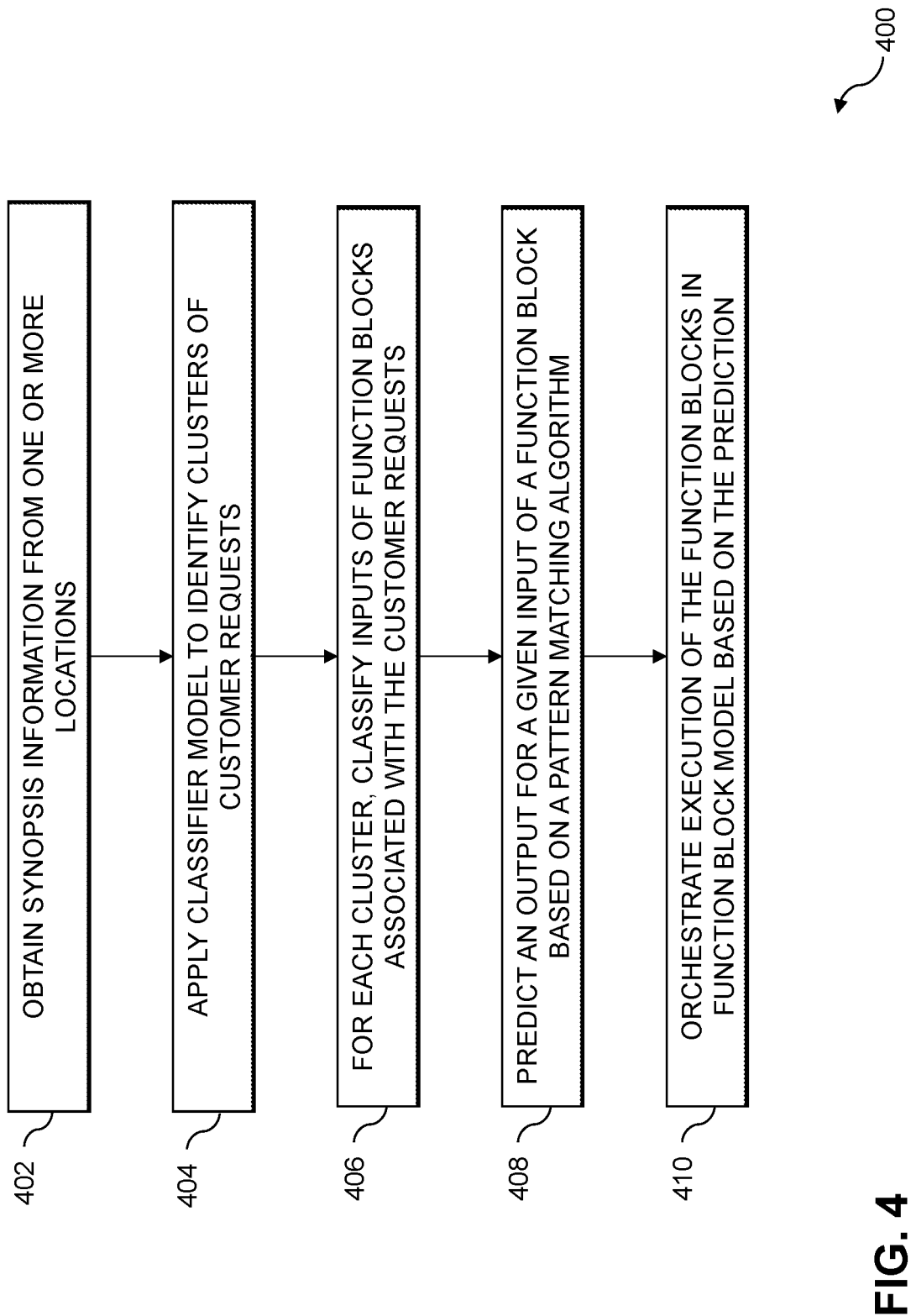
FIG. 4 shows a flow diagram of a machine learning process for generating improved function block models in accordance with an illustrative embodiment.

Referring now to FIG. 4, this figure shows a flow diagram of a machine learning process 400 for generating improved function block models in accordance with an illustrative embodiment. It is to be understood that this particular process 400 is only an example, and additional or alternative processes can be carried out in other embodiments. In this embodiment, the process 400 includes steps 402 through 410. These steps are assumed to be performed by the service management system 105 utilizing at least in part model generator 124.

Step 402 includes obtaining synopsis information generated by respective usage data processing engines from one or more locations.

Step 404 includes applying a classifier model to identify clusters of customer requests. For example, the classifier model can be trained on data related to the customers, including the information of subscription services related to customer requests and the execution order of function blocks that were used to process usage data. In some embodiments, the classifier can be a Naïve Bayes classifier, for example. Accordingly, in at least some embodiments, the classifier model can result in one or more clusters of customer requests, where each cluster comprises similar requests.

Step 406 includes, for each cluster of customer requests, classifying the inputs of function blocks associated with the customer request. More specifically, within each cluster from step 404, the inputs are classified into one or more function block clusters, where each dataset in a given function block cluster comprises a similar type of function block input. The input, in at least one embodiment, can be classified in a similar manner as described in step 406 (e.g., using a Naïve Bayes classifier).

Step 408 includes predicting an output for a given input of a function block based on a pattern matching algorithm. For example, the pattern matching algorithm can be based at least in part on a Stochastic Neighbor Embedding (SNE) algorithm, such as a t-distributed stochastic neighbor embedding (T-SNE) algorithm. The output of the pattern matching algorithm can optionally be used to visualize clusters of different input types for similar function blocks.

Step 410 includes orchestrating the execution of the function blocks based on the predicted output. As an example, assume that the predicted output is substantially the same for inputs of a given function block (such as in the example above where the identify ratable metric function, associated with function block 3, always returns "false"). Then, step 410 can include suggesting a modification of the orchestration of a function block model so that the result for that particular function block is set to "false" without needing to execute function block 3, thus improving the efficiency (e.g., in terms of time and/or processing resources) for processing the usage data. As another example, if the predicted output is "error" when executing two function blocks in parallel (e.g., due to a race condition), then step 408 can adjust the model so that the function blocks are performed in series, thereby avoiding the race condition error.

In at least one embodiment, this information can be used by the service management system 105 to automatically adjust a function block model. Additionally, or alternatively, a user can manually update a given function block model based on the visualization generated at step 408, for example. Accordingly, the service management system 105 can learn to improve the function block models deployed at different locations 114 based on the synopsis information.

The service management system 105, in some embodiments, can use the ML-based process to provide improved function block models and orchestration information to process usage data corresponding to a new request from a customer when it is within some threshold level of similarity to a historical customer request (either from the same customer or a different customer).

Figure 5:
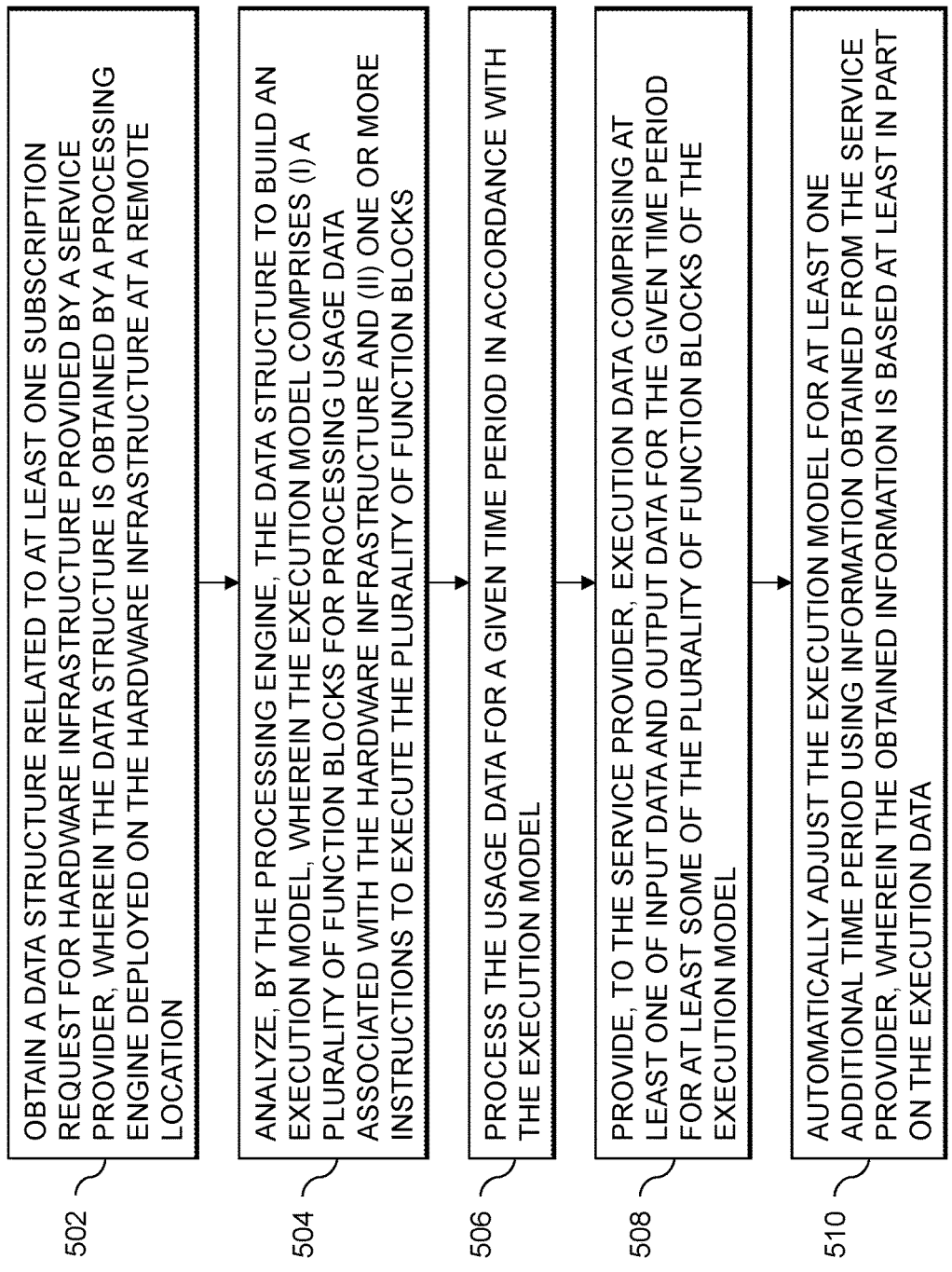
FIG. 5 shows a flow diagram of a process for processing usage data in an illustrative embodiment.

FIG. 5 shows a flow diagram of a process 500 for processing usage data in an illustrative embodiment. It is to be understood that this particular process 500 is only an example, and additional or alternative processes can be carried out in other embodiments.

In this embodiment, the process includes steps 502 through 510. These steps are assumed to be performed by the remote device 102-1 utilizing its usage data processing engine 110.

Step 502 includes obtaining a data structure related to at least one subscription request for hardware infrastructure provided by a service provider, wherein the data structure is obtained by a processing engine deployed on the hardware infrastructure at a remote location. Step 504 includes analyzing, by the processing engine, the data structure to build an execution model, wherein the execution model comprises (i) a plurality of function blocks for processing usage data associated with the hardware infrastructure and (ii) one or more instructions to execute the plurality of function blocks. Step 506 includes processing the usage data for a given time period in accordance with the execution model. Step 508 includes providing, to the service provider, execution data comprising at least one of input data and output data for the given time period for at least some of the plurality of function blocks of the execution model. Step 510 includes automatically adjusting the execution model for at least one additional time period using information obtained from the service provider, wherein the obtained information is based at least in part on the execution data.

Each of the plurality of function blocks may include a sub-process for performing at least one of a metering, a rating, and a billing process associated with the at least one subscription request. The at least one subscription request may be associated with a plurality of subscription items comprising at least one of: one or more types of storage services provided by the hardware infrastructure, one or more types of processing services provided by the hardware infrastructure, and one or more networking services provided by the hardware infrastructure. The execution model may use at least a given one of the plurality of function blocks for two or more of the plurality of subscription items. The execution model may be built at least in part by downloading and installing software images corresponding to the plurality of function blocks via an application programming interface associated with the service provider. The process 500 may include downloading and installing one or more additional software images for one or more additional function blocks to process usage data corresponding to at least one of: a new subscription request and a modification to the at least one subscription request; and updating the execution model to include the one or more additional function blocks. The process 500 may include, in response to a modification to the at least one subscription request, performing at least one of: (i) removing at least one of the plurality of function blocks from the execution model and (ii) uninstalling at least one of the software images for at least one of the plurality of function blocks. The information obtained for adjusting the execution model may be based at least in part on a machine learning process that is trained on historical execution data corresponding to usage data processed and uploaded by hardware infrastructure deployed at multiple geographic locations. The machine learning process may include at least one of: a Naïve Bayes classifier and a stochastic neighbor embedding model. The adjusted execution model may (i) assign an output to at least one of the plurality of function blocks and (ii) prevent the at least one function block from being executed. The remote location can be an edge location (e.g., a customer location).

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to remotely process usage data associated with managed hardware infrastructure while reducing the need for additional hardware resources to process information. These and other embodiments can effectively overcome problems associated with existing remote data collection techniques that generally process the usage data within a central server or cloud of the service provider.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
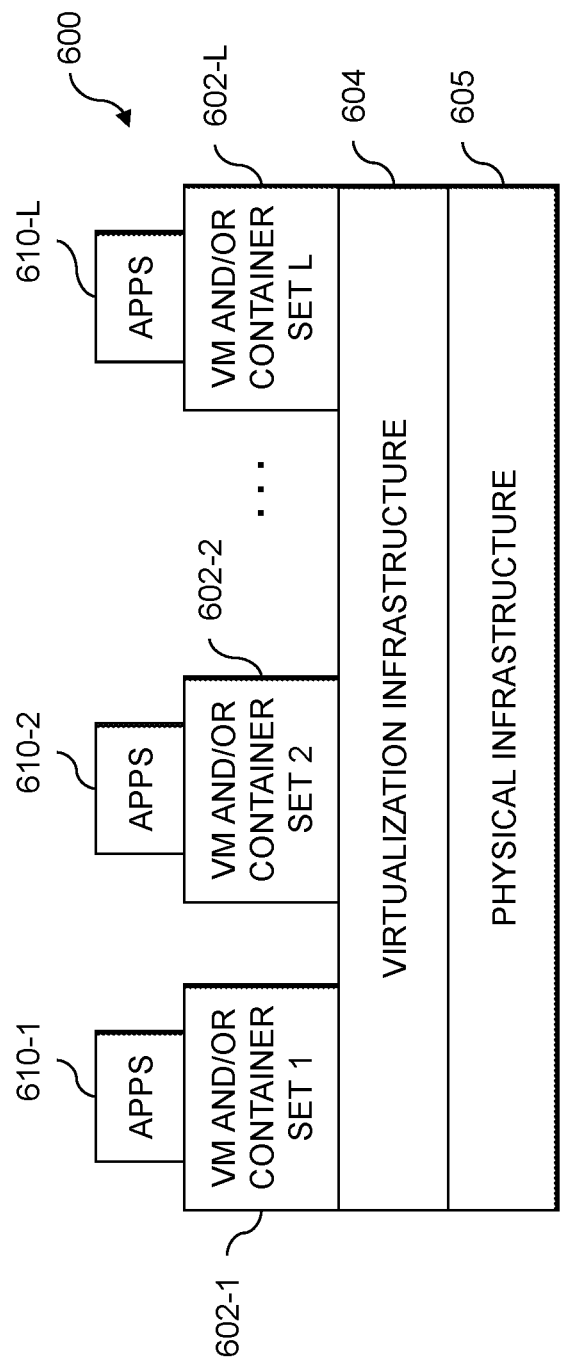
FIGS. 6 and 7 show examples of processing platforms that may be utilized to implement at least a portion of an information processing system in illustrative embodiments.
Figure 7:
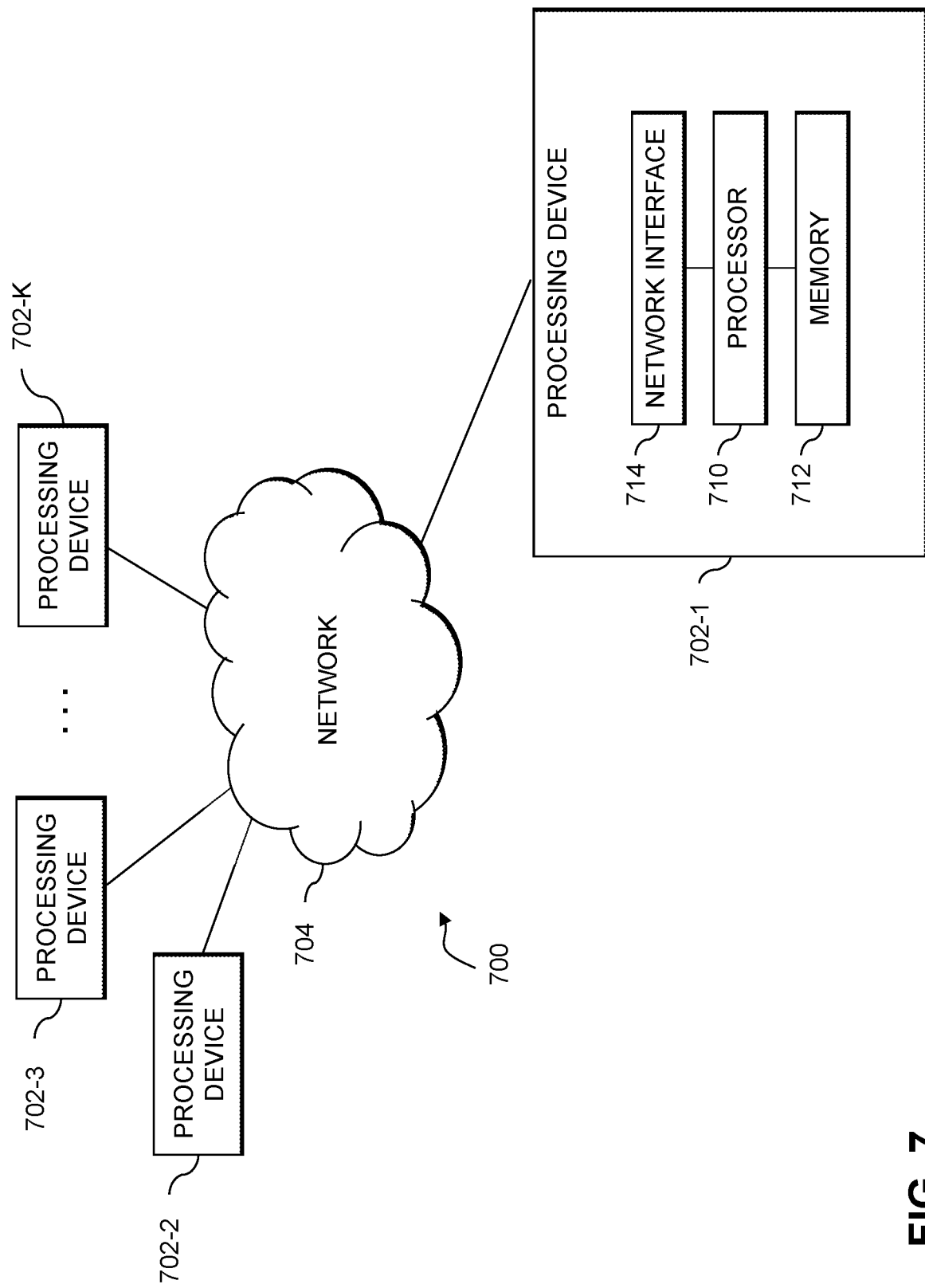

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA or other type of processing circuitry, as well as portions or combinations of such circuitry elements.

The memory 712 comprises RAM, ROM or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining a data structure related to at least one subscription request for hardware infrastructure provided by a service provider, wherein the data structure is obtained by at least one first processing device deployed on the hardware infrastructure at a first geographic location, and wherein the data structure comprises information identifying a plurality of function blocks and an execution order of the plurality of function blocks;
analyzing, by the at least one first processing device, the data structure to build an execution model, wherein the execution model comprises (i) the plurality of function blocks for processing usage data associated with the hardware infrastructure and (ii) one or more instructions to execute the plurality of function blocks in the execution order of the plurality of function blocks indicated in the data structure;
processing the usage data for a given time period in accordance with the execution model;
providing, to at least one second processing device of the service provider, execution data comprising at least one of input data and output data for the given time period for at least one or more function blocks of the plurality of function blocks of the execution model, wherein the at least one second processing device of the service provider is at a second geographic location that is remote from the first geographic location, and wherein the at least one second processing device of the service provider applies a machine learning process trained on historical execution data to predict at least one adjustment to at least one of: (i) the plurality of function blocks for at least one additional time period and (ii) the execution order of the plurality of function blocks for the at least one additional time period; and
automatically adjusting the execution model for the at least one additional time period using information obtained from the at least one second processing device of the service provider, wherein the automatically adjusting comprises automatically modifying, based on the at least one adjustment predicted by the machine learning process, at least one of: (i) the plurality of function blocks and (ii) the execution order of the plurality of function blocks;
wherein the computer-implemented method is performed by the at least one first processing device, and wherein the at least one first processing device comprises a processor coupled to a memory.

2. The computer-implemented method of claim 1, wherein each function block of the plurality of function blocks comprises a sub-process for performing at least one of a metering, a rating, and a billing process associated with the at least one subscription request.

3. The computer-implemented method of claim 1, wherein the at least one subscription request is associated with a plurality of subscription items comprising at least one of: one or more types of storage services provided by the hardware infrastructure, one or more types of processing services provided by the hardware infrastructure, and one or more networking services provided by the hardware infrastructure.

4. The computer-implemented method of claim 3, wherein the execution model uses at least a given function block of the plurality of function blocks for two or more subscription items of the plurality of subscription items.

5. The computer-implemented method of claim 1, wherein the execution model is built at least in part by downloading and installing software images corresponding to the plurality of function blocks via an application programming interface associated with the service provider.

6. The computer-implemented method of claim 5, further comprising:
downloading and installing one or more additional software images for one or more additional function blocks to process usage data corresponding to at least one of: a new subscription request and a modification to the at least one subscription request; and
updating the execution model to include the one or more additional function blocks.

7. The computer-implemented method of claim 5, further comprising:
in response to a modification to the at least one subscription request, performing at least one of: (i) removing at least one function block of the plurality of function blocks from the execution model and (ii) uninstalling at least one of the software images for at least one function block of the plurality of function blocks.

8. The computer-implemented method of claim 1, wherein the historical execution data corresponds to usage data processed and uploaded by hardware infrastructure deployed at multiple geographic locations.

9. The computer-implemented method of claim 8, wherein the machine learning process comprises at least one of: a Naive Bayes classifier and a stochastic neighbor embedding model.

10. The computer-implemented method of claim 9, wherein the machine learning process is configured to predict the output data for at least one or more function blocks of the plurality of function blocks of the execution model over the at least one additional time period, and wherein the execution order of the plurality of function blocks is adjusted based at least in part on the predicted output data.

11. The computer-implemented method of claim 1, wherein the adjusted execution model: (i) assigns an output to at least one function block of the plurality of function blocks and (ii) prevents the at least one function block of the plurality of function blocks from being executed.

12. A non-transitory processor-readable storage medium having stored therein program code of one or more software programs, wherein the program code, when executed by at least one first processing device, causes the at least one first processing device to:
  obtain, by the at least one first processing device, a data structure related to at least one subscription request for hardware infrastructure provided by a service provider, wherein the at least one first processing device is deployed on the hardware infrastructure at a first geographic location, and wherein the data structure comprises information identifying a plurality of function blocks and an execution order of the plurality of function blocks;
  analyze, by the at least one first processing device, the data structure to build an execution model, wherein the execution model comprises (i) the plurality of function blocks for processing usage data associated with the hardware infrastructure and (ii) one or more instructions to execute the plurality of function blocks in the execution order of the plurality of function blocks indicated in the data structure;
  process the usage data for a given time period in accordance with the execution model;
  provide, to at least one second processing device of the service provider, execution data comprising at least one of input data and output data for the given time period for at least one or more function blocks of the plurality of function blocks of the execution model, wherein the at least one second processing device of the service provider is at a second geographic location that is remote from the first geographic location, and wherein the at least one second processing device of the service provider applies a machine learning process trained on historical execution data to predict at least one adjustment to at least one of: (i) the plurality of function blocks for at least one additional time period and (ii) the execution order of the plurality of function blocks for the at least one additional time period; and
  automatically adjust the execution model for the at least one additional time period using information obtained from the at least one second processing device of the service provider, wherein the automatically adjusting comprises automatically modifying, based on the at least one adjustment predicted by the machine learning process, at least one of: (i) the plurality of function blocks and (ii) the execution order of the plurality of function blocks.

13. The non-transitory processor-readable storage medium of claim 12, wherein each function block of the plurality of function blocks comprises a sub-process for performing at least one of a metering, a rating, and a billing process associated with the at least one subscription request.

14. The non-transitory processor-readable storage medium of claim 12, wherein the at least one subscription request is associated with a plurality of subscription items comprising at least one of: one or more types of storage services provided by the hardware infrastructure, one or more types of processing services provided by the hardware infrastructure, and one or more networking services provided by the hardware infrastructure.

15. The non-transitory processor-readable storage medium of claim 14, wherein the execution model uses at least a given function block of the plurality of function blocks for two or more subscription items of the plurality of subscription items.

16. The non-transitory processor-readable storage medium of claim 12, wherein the execution model is built at least in part by downloading and installing software images corresponding to the plurality of function blocks via an application programming interface associated with the service provider.

17. An apparatus comprising:
  at least one first processing device comprising a processor coupled to a memory;
  the at least one first processing device being configured to:
  obtain, by the at least one first processing device, a data structure related to at least one subscription request for hardware infrastructure provided by a service provider, wherein the at least one first processing device is deployed on the hardware infrastructure at a first geographic location, and wherein the data structure comprises information identifying a plurality of function blocks and an execution order of the plurality of function blocks;
  analyze, by the at least one first processing device, the data structure to build an execution model, wherein the execution model comprises (i) the plurality of function blocks for processing usage data associated with the hardware infrastructure and (ii) one or more instructions to execute the plurality of function blocks in the execution order of the plurality of function blocks indicated in the data structure;
  process the usage data for a given time period in accordance with the execution model;
  provide, to at least one second processing device of the service provider, execution data comprising at least one of input data and output data for the given time period for at least one or more function blocks of the plurality of function blocks of the execution model, wherein the at least one second processing device of the service provider is at a second geographic location that is remote from the first geographic location, and wherein the at least one second processing device of the service provider applies a machine learning process trained on historical execution data to predict at least one adjustment to at least one of: (i) the plurality of function blocks for at least one additional time period and (ii) the execution order of the plurality of function blocks for the at least one additional time period; and automatically adjust the execution model for the at least one additional time period using information obtained from the at least one second processing device of the service provider, wherein the automatically adjusting comprises automatically modifying, based on the at least one adjustment predicted by the machine learning process, at least one of: (i) the plurality of function blocks and (ii) the execution order of the plurality of function blocks.

18. The apparatus of claim 17, wherein each function block of the plurality of function blocks comprises a subprocess for performing at least one of a metering, a rating, and a billing process associated with the at least one subscription request.

19. The apparatus of claim 17, wherein the at least one subscription request is associated with a plurality of subscription items comprising at least one of: one or more types of storage services provided by the hardware infrastructure, one or more types of processing services provided by the hardware infrastructure, and one or more networking services provided by the hardware infrastructure.

20. The apparatus of claim 17, wherein the execution model is built at least in part by downloading and installing software images corresponding to the plurality of function blocks via an application programming interface associated with the service provider.

* * * * *